(12) United States Patent
Handa

(10) Patent No.: US 7,743,797 B2
(45) Date of Patent: Jun. 29, 2010

(54) GAS FLOW MANAGEMENT EQUIPMENT FOR HIGH PRESSURE STORAGE TANKS

(76) Inventor: Kiyoshi Handa, 21001 State Route 739 c/o Honda R&D Americas, Inc., Raymond, OH (US) 43067-9705

(*) Notice: Subject to any disclaimer, the term of this patent is extended or adjusted under 35 U.S.C. 154(b) by 764 days.

(21) Appl. No.: 11/682,470

(22) Filed: Mar. 6, 2007

(65) Prior Publication Data

US 2007/0246122 A1    Oct. 25, 2007

Related U.S. Application Data

(63) Continuation-in-part of application No. 11/279,574, filed on Apr. 13, 2006, now Pat. No. 7,377,294, and a continuation-in-part of application No. 11/380,429, filed on Apr. 27, 2006, now Pat. No. 7,637,292, and a continuation-in-part of application No. 11/381,005, filed on May 1, 2006, now Pat. No. 7,681,604, and a continuation-in-part of application No. 11/380,996, filed on May 1, 2006.

(51) Int. Cl.
*B65B 1/04* (2006.01)

(52) U.S. Cl. ........................................... 141/82

(58) Field of Classification Search .................. 141/2, 141/18, 98, 286, 67; 62/50.1–50.5; 123/525; 137/255; 272/146.1, 146.6
See application file for complete search history.

(56) References Cited

U.S. PATENT DOCUMENTS

| 6,182,717 | B1 * | 2/2001 | Yamashita | 141/82 |
| 6,899,146 | B2 * | 5/2005 | Bingham et al. | 141/11 |
| 7,021,341 | B2 * | 4/2006 | Viegas et al. | 141/82 |
| 7,124,790 | B2 * | 10/2006 | Bushko | 141/82 |
| 2005/0271916 | A1 * | 12/2005 | Yang et al. | 429/20 |

* cited by examiner

*Primary Examiner*—Steven O Douglas
(74) *Attorney, Agent, or Firm*—Mark E. Duelland; Porter Wright Morris & Arthur, LLP

(57) ABSTRACT

In situ gas flow management equipment disposed within a high pressure industrial gas storage tank wherein interior longitudinally extending thermal management equipment interconnected with an external heat exchanger is installed in the interior of the tank along the central axis thereof and includes a stem extending from one end of the thermal management equipment, a fixed receptacle at an end of the tank disposed in operative relationship with the stem such that longitudinal displacement and axial rotation between the stem and receptacle is permitted, and a gas flow control embedded within the receptacle regulating the flow of gas into and from the tank, the in situ device therein, the external heat exchanger, and means for refilling and depleting the tank. Single ended and dual ended examples are described.

13 Claims, 8 Drawing Sheets

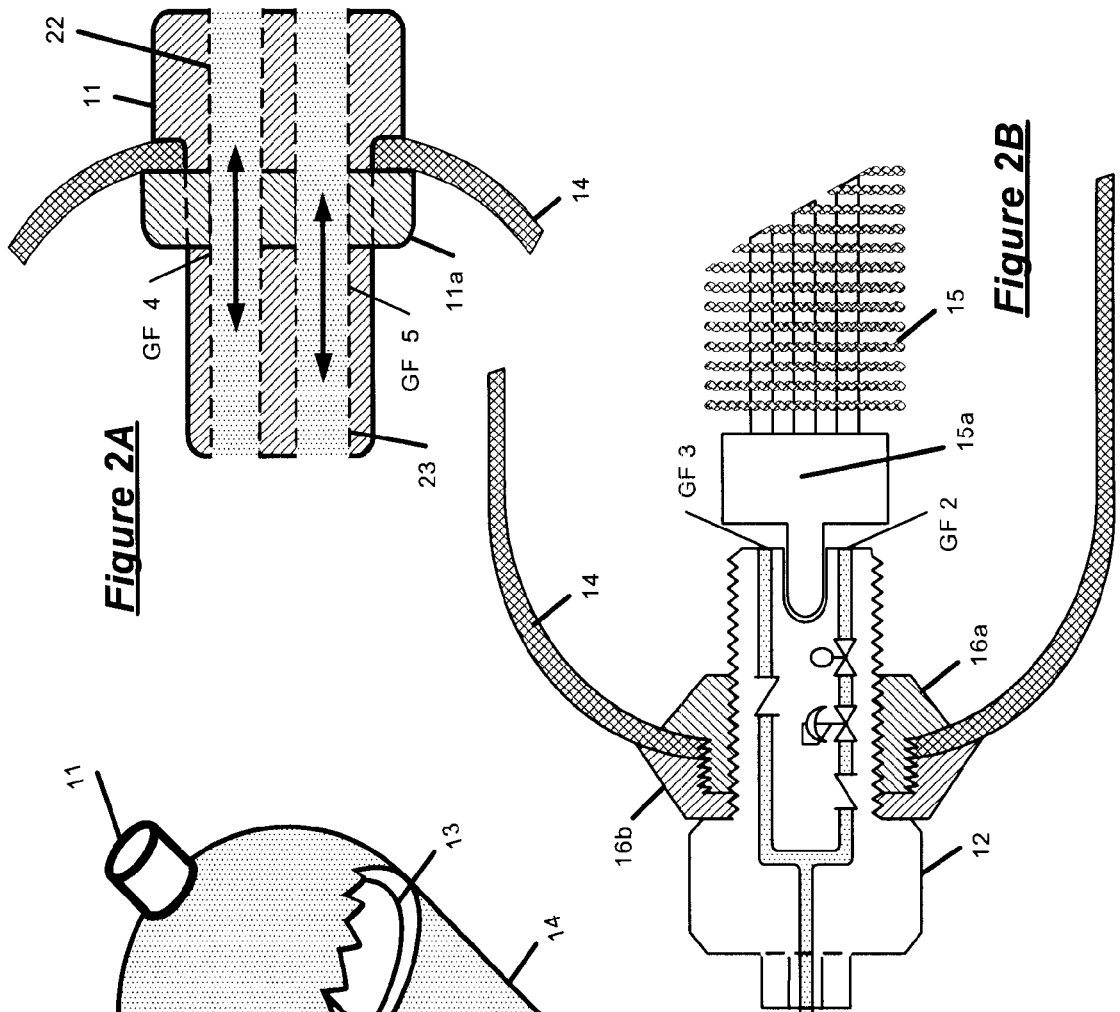
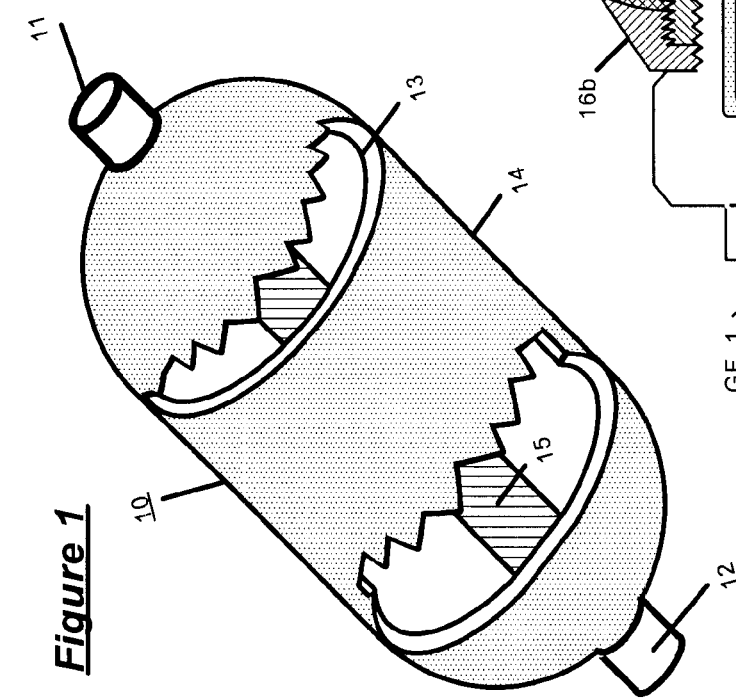

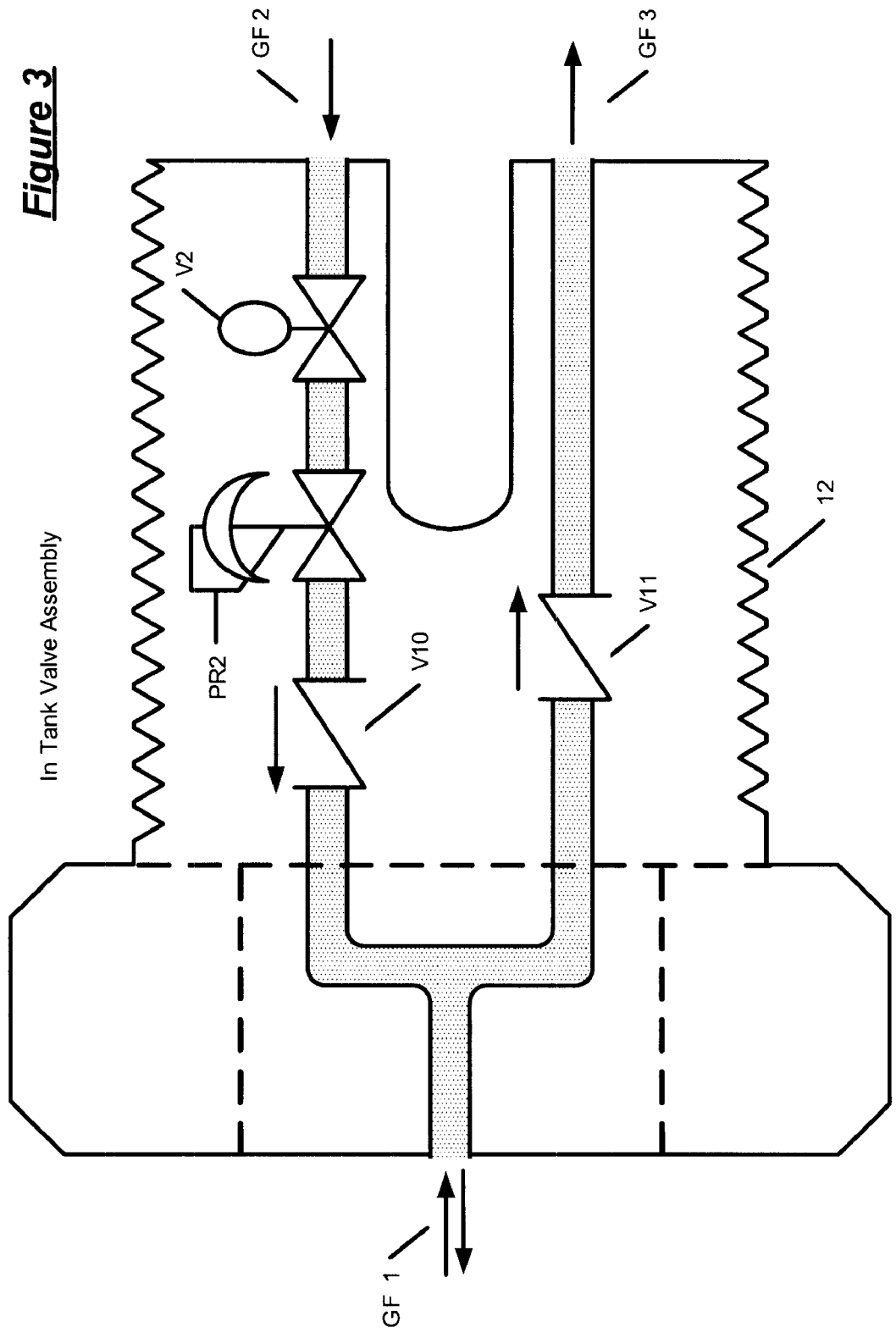

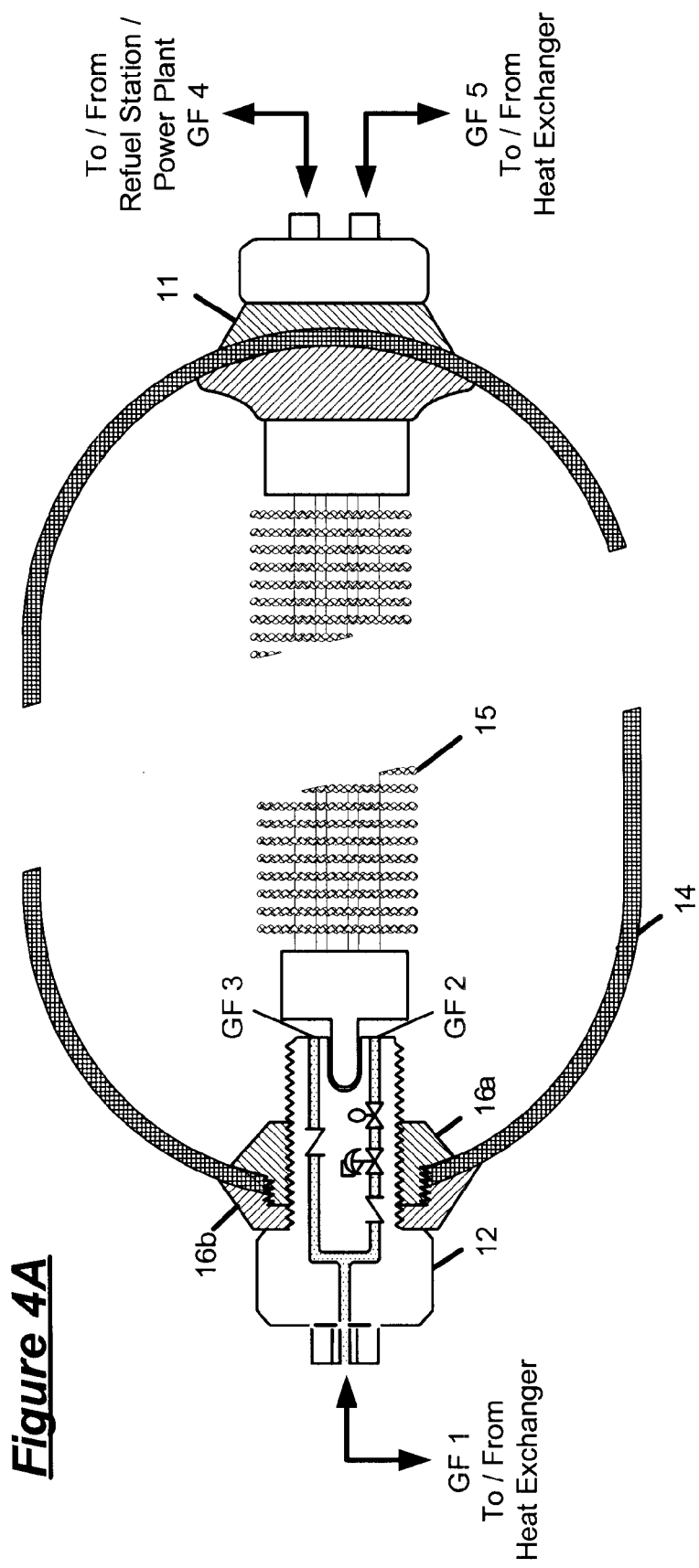

[REFUELING]

[DE-PRESSURIZING]

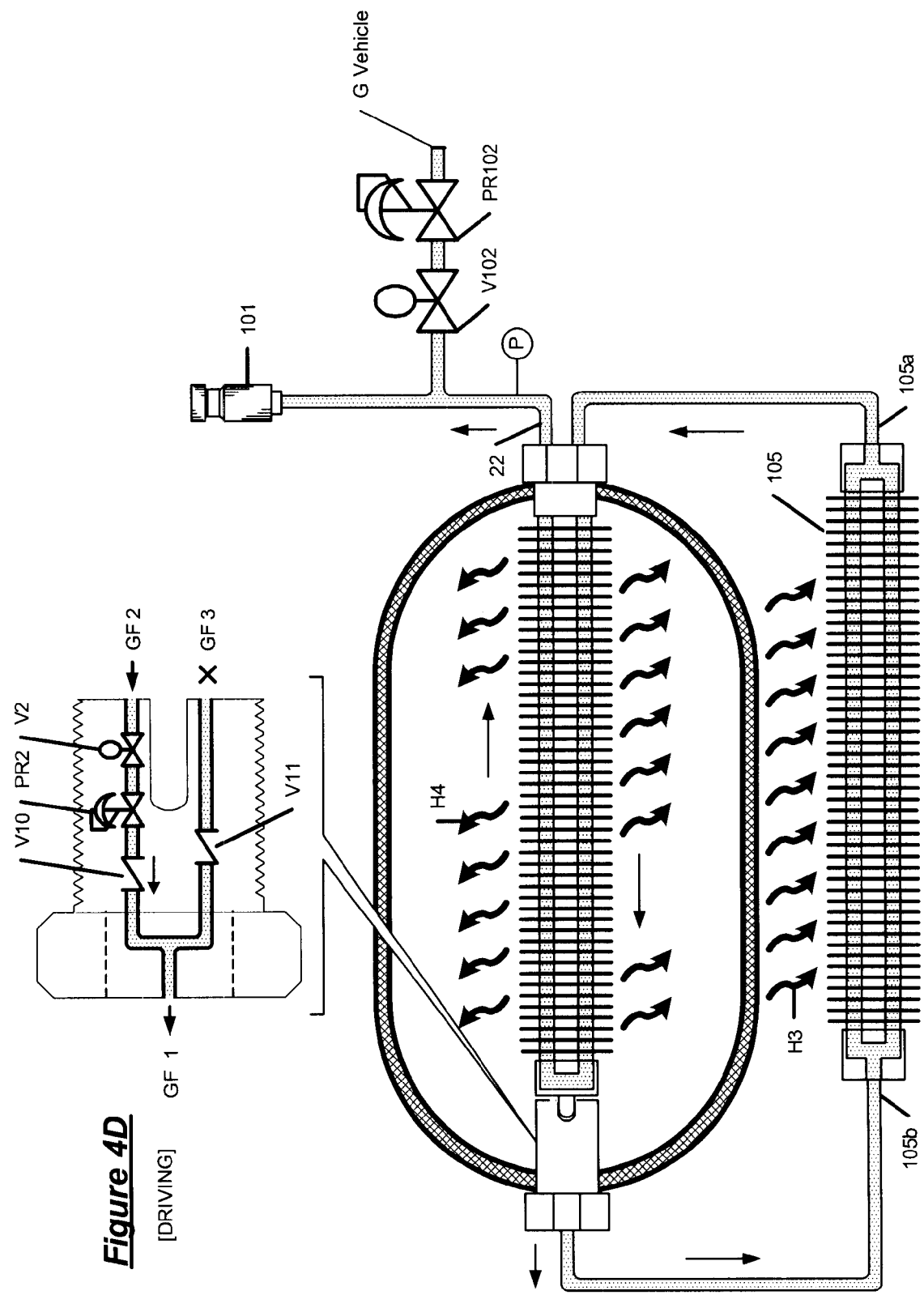

[PARKING]

GAS FLOW MANAGEMENT EQUIPMENT FOR HIGH PRESSURE STORAGE TANKS

RELATED APPLICATIONS

This is a continuation in part of my co-pending applications for United States Letters Patent Gas Cooling Methods for High Pressure Fuel Storage Tanks on Vehicles Powered by Compressed Natural Gas or Hydrogen, Ser. No. 11/279,574 filed on Apr. 13, 2006; Pressure Powered Cooling System for Enhancing the Refill Speed and Capacity of On Board High Pressure Vehicle Gas Storage Tanks, Ser. No. 11/380,429 filed on Apr. 27, 2006; Gas Cooling Method Using a Melting/Solidifying Media for High Pressure Storage Tanks for Compressed Natural Gas or Hydrogen, Ser. No. 11/381,005 filed on May 1, 2006; and System for Enhancing the Efficiency of High Pressure Storage Tanks for Compressed Natural Gas or Hydrogen, Ser. No. 11/380,996 filed on May 1, 2006.

FIELD OF THE INVENTION

The present invention relates to attaching mechanisms for in situ thermal management equipment used in high pressure storage tanks for industrial gases such as gas fuels utilized in motor vehicles, and particularly to on board storage tanks for hydrogen and CNG gas fueled vehicles. A system is provided for enhancing the performance of high pressure storage tanks for hydrogen and CNG gas fuel, or any other industrial gas, by compensating for thermal and mechanical stresses caused during the refill, depletion, and environmental exposure of the tanks.

Typically, in motor vehicles using hydrogen to power fuel cells or using compressed natural gas (CNG) to power internal combustion engines, present practice is that fuel is stored in on board tanks maintained at a maximum pressure in the range of about 5000 psi for hydrogen and 3600 psi for CNG. Higher pressures in the range of about 10,000 psi or more are anticipated as the use of hydrogen and CNG becomes more prevalent. The in situ techniques I have developed to the manage thermal energy differences between high pressure gas in a tank and the environment of the tank in a vehicle involve heat exchanger devices fixed within the tank (to absorb and radiate heat) operatively interconnected with an external heat exchanger (correlatively to radiate and absorb heat) in the sequence of the refill and depletion of the high pressure gas within the tank. Thermal and mechanical stresses are caused by the pressure changes associated with refill and depletion of the tanks, and changes in the hot and cold temperature of the ambient environment of the tanks affect stresses in the tanks.

In the specification herein, reference to hydrogen fuel cell vehicles also correlates with the use of the invention with CNG (compressed natural gas) and hydrogen powered internal combustion engine vehicles. Although hydrogen is referred to in the specification and examples, "hydrogen" is a term in most instances intended to be interchangeable with CNG, and if so useful, other industrial gases such as air. Collectively all are referred to as a "gas" or "high pressure gas."

The gas in pressurized storage tanks may be characterized as including several forms of energy: chemical energy from the gas itself (consumed in powering the vehicle), and mechanical energy and thermal energy, both associated with the high pressure under which the gas is refueled, stored and depleted. Thermal energy translates into temperature fluctuations inside and outside an on board tank that, along with pressure variations, cause mechanical stress in the tank system as a result of the expansion and contraction of the physical components that comprise the tank and the in situ thermal management devices therein, such as are referenced in my applications listed above, that mange thermal energy associated with inflow and outflow of high pressure gas into and from a tank. High pressure itself is also a stress inducing factor in tank components.

Relative axial displacement or rotation and longitudinal extension between an in situ heat exchanger or other thermal management device and the interior of a high pressure on board fuel storage tank occurs as a result of stress factors associated with temperature and pressure changes occurring in the tank assembly during fill and depletion of gas in the tank. A mechanical compensation system is therefore desirable for stresses induced within the tank and the environment of the tank; the compensation system is also desirably integrated with a valve control system for regulating the flow of gas to and from the tank. An installation system for heat exchangers has been developed by and is the subject of a co-pending application for Letters Patent filed by my coworker and colleague, Ryan Douglas Roy Harty, entitled "Attaching In situ Thermal Management Equipment to High Pressure Storage Tanks for Industrial Gases," Ser. No. 11/705,970 filed on Feb. 12, 2007.

OBJECT OF THE INVENTION

It is an object of the present invention to adapt the installation of a thermal management system within a tank interior with a center port valve control system for regulating the flow of gas to and from the tank. It is a further object to accommodate the effects of relative longitudinal movement and axial displacement or rotation between an in situ heat exchanger or other thermal management device and a high pressure on board fuel storage tank as are caused by stress factors associated with temperature and pressure changes occurring in the tank assembly during fill and depletion of gas in the tank.

SUMMARY OF THE INVENTION

The present invention adapts the installation of in situ thermal management equipment, such as a heat exchanger, to a high pressure fuel gas storage tank to a center port in tank valve assembly that permits 1) low pressure operation in fuel conduit tubes during driving; 2) tank warming during driving; and 3) complete shut off during parking. In accordance with the invention, the advantages of the system described in aforementioned Ser. No. 11/705,970 filed on Feb. 12, 2007 are achieved and further improvements in operating efficiencies are realized.

Thus, sources of relative axial displacement or rotation between the heat exchanger and the tank caused by temperature and pressure changes, vibrations, manufacturing discrepancies, torque applied to the tank plugs; creep or relaxation, and the effects of the external environment are ameliorated. In a high pressure gas tank cooling system, the invention provides a structure for the internal heat management system in which a heat exchanger is centrally positioned in the tank along the longitudinal axis thereof, gas cooling is provided for the tank refill stage of gas usage, gas warming is provided for the tank depletion stage of gas usage, and a layout for many parts is feasible. The invention is suitable for use with a tank having an end cap at both ends as well as a tank having a center port layout and component assembly is facilitated for either embodiment.

In a first embodiment relating to a high pressure gas storage tank with caps at each end, the invention provides a center port structure having a valve assembly intrinsically within the end cap type. The cap positions the heat transfer system within the tank and the valves are regulated to provide low pressure operation of the gas flow tubes within the heat exchanger during driving, tank warming during driving, and a complete shut off of gas flow when a vehicle is parked.

The invention is described more fully in the following description of the preferred embodiment considered in view of the drawings in which:

BRIEF DESCRIPTION OF THE SEVERAL VIEWS OF THE DRAWINGS

FIG. 1 shows a typical high pressure gas storage tank.

FIG. 2A shows in cross section an example of an end cap configuration utilized in the invention at one end of the tank.

FIG. 2B shows in cross section an example of an end cap configuration utilized in the invention at the other one end of the tank with a pin and receptacle mount in the tank interior and an embedded valve and pressure regulator system disposed within the receptacle element of the end cap.

FIG. 3 shows in cross section a detail view of an example of an end cap configuration shown in FIG. 2B depicting the embedded valve and pressure regulator system disposed within the end cap.

FIG. 4A is a general depiction of a longitudinal cross section showing fluid flow in a two ended tank system of the invention. In an example contemplating use in a vehicle, FIG. 4B, FIG. 4C, FIG. 4D and FIG. 4E depict, respectively, operation of the end cap valve system for the fuel tank and the vehicle fuel system in the power plant/vehicle modes of refueling, de-pressurizing, driving and parking.

DETAILED DESCRIPTION OF THE INVENTION

Figure 4B:
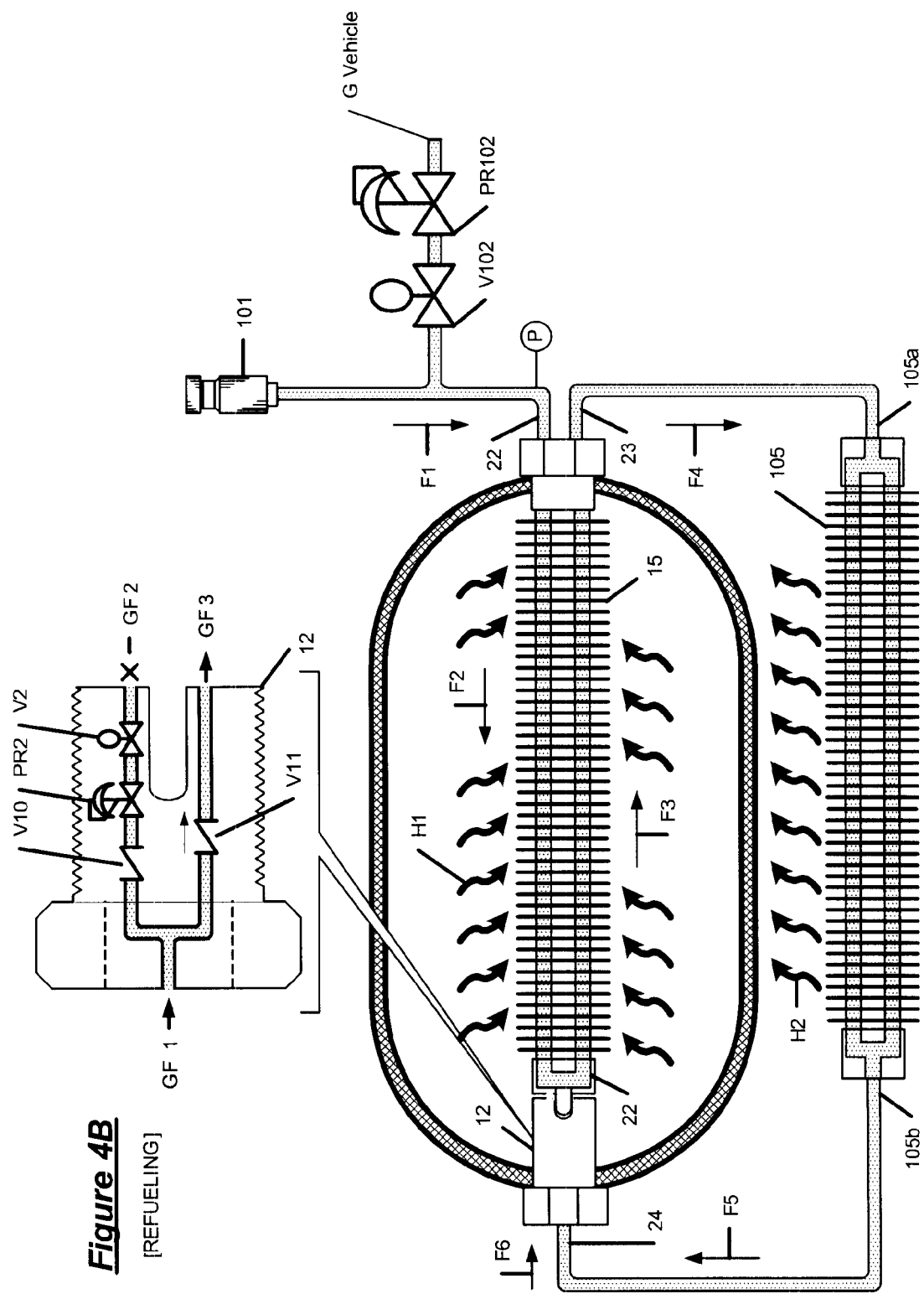
Figure 4C:
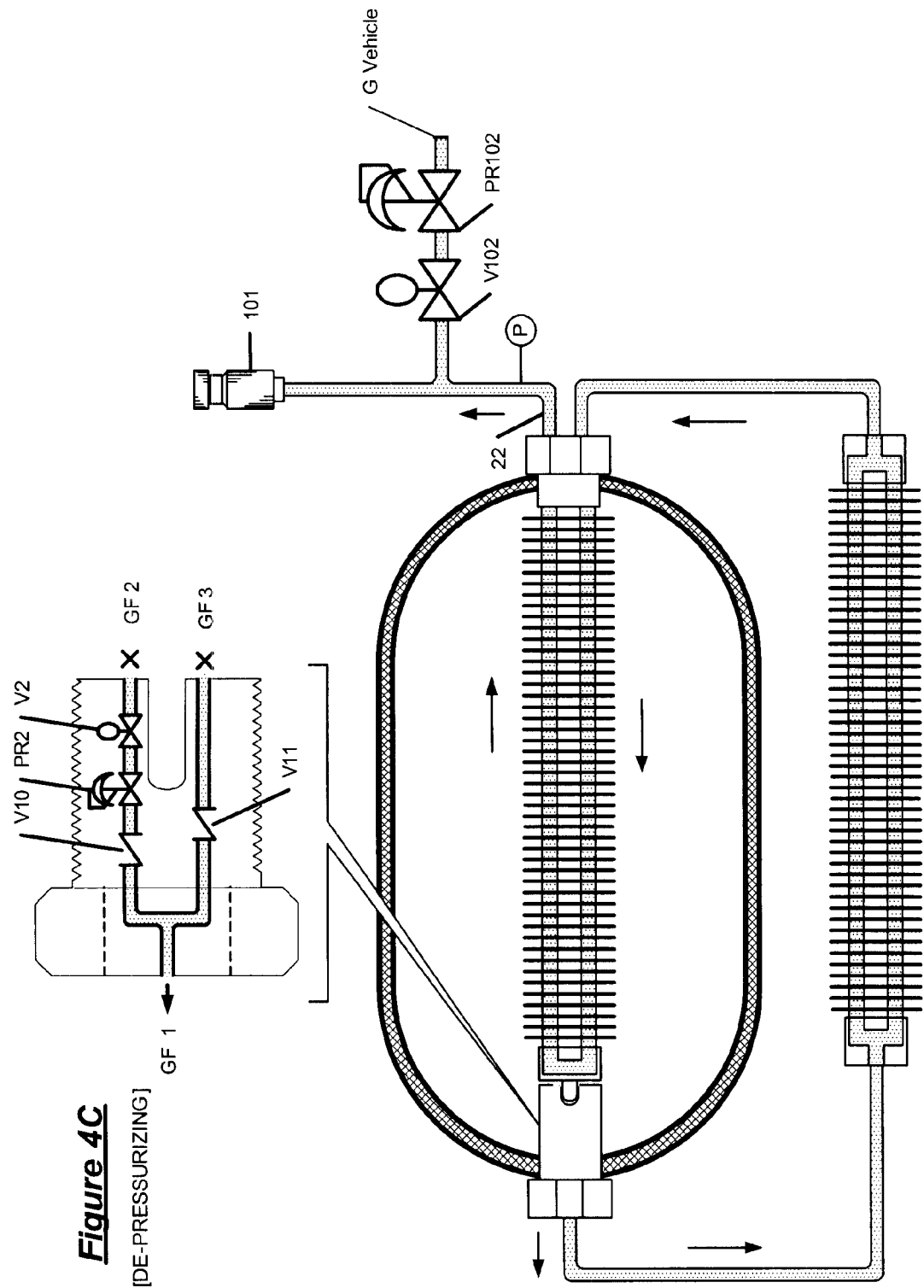
Figure 4E:
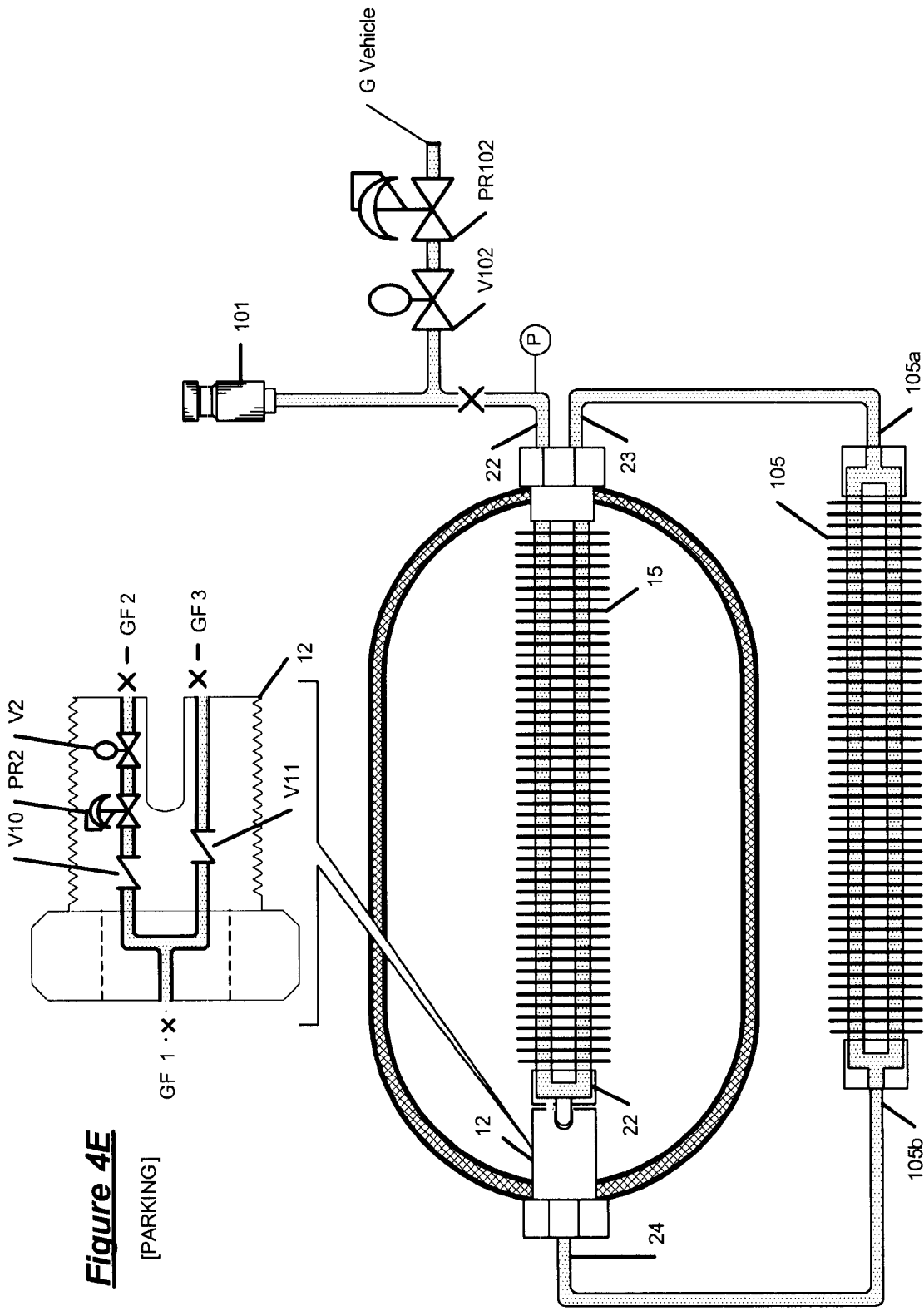

Typically, on board vehicle tanks are cylindrical with hemispherical ends and are design capable of storing a charge of high pressure gas at an approximately 5000 psi, and up to 10,000 psi or more maximum rated capacity at a defined temperature. As illustrated in FIG. 1, high pressure storage tanks for industrial gas use 10 are typically formed from strongly reinforced carbon fiber walls 14 and include a plastic or other liner 13 and bosses 11 an 12 at one or either end thereof, to which an in situ interior thermal management system 15 is installed.

In FIG. 2A and in FIG. 2B respective end bosses for mounting a interior thermal management system are shown that are centrally and axially positioned upon a tank as utilized in one example of the invention. FIG. 2A shows in cross section an example of an end cap configuration 11 utilized in the invention at one end of the tank wherein exterior cap 11 is mated to interior cap segment 11a to securely fix the cap at one end of the tank. Cooperating elements 11 and 11a are secured to the tank 14 by a threaded connection, or some other manner that secures the system tightly to the one end of the tank such that the connection rigidly constrains movement of the thermal management apparatus installed at one end of the tank in all degrees of freedom. Fuel gas flow GF 4 and gas flow GF 5 into and from the tank thermal management system is effected through orifices or conduit channels 22 and 23. In FIG. 2B, the opposite end cap is shown in cross section. FIG. 2B illustrates an example of an end cap configuration utilized in the invention at the other one end of the tank with a pin and receptacle mount in the tank interior and an embedded valve and pressure regulator system disposed within the receptacle element of the end cap. In the illustrated embodiment relating to a high pressure gas storage tank with caps at each end of the tank, the invention provides a center port structure having a valve and regulator assembly intrinsically within the end cap type. One end cap, FIG. 2A, positions the heat transfer system 15 upon the tank 14 and the valves and regulator shown in FIG. 3 in the pin 15a and receptacle 12 end cap of FIG. 2B. Mating sections 16a and 16b of the tank boss are also shown. The valves and regulator are operated to provide low pressure operation of the gas flow conduit GF 1 and gas flow conduit GF 2 and gas flow conduit GF 3 into and from the tank thermal management and fuel system within the heat exchanger and tank during driving, to provide tank warming during driving, and to shut off completely the gas flow when a vehicle is parked.

The receptacle element of the end cap is shown in cross section in the detail view of FIG. 3 depicting the embedded valves, check valve V10, check valve V11 and gate valve V2 and pressure regulator PR2 disposed within the end cap 12. Gas flow conduit GF 1 and gas flow conduit GF 2 and gas flow conduit GF 3 into and from the tank are likewise operatively disposed with respect to the valves and regulator, embedded in the end cap.

FIG. 4B, FIG. 4C, FIG. 4D, and FIG. 4E depict, respectively, operation of the two ended end cap system illustrated in FIG. 4A for the fuel tank and the vehicle fuel system in the power plant/vehicle operating modes of refueling, de-pressurizing, driving and parking. In the double end type, during the refueling mode shown in FIG. 4B, V102 and V2 are closed preventing operation of the power plant. Gas flows from depot receptacle 101 to the tank interior gas in the flow F1 → into the tank, F2 → and F3 → circulating within the heat exchanger in the tank interior, F4 → and F5 circulating through the external cooling radiator through → F6 into the tank through conduit GF 3 is cooled by the refueling gas itself. Heat H1 is absorbed by the heat exchanger 15 and radiated as H2 from the external heat exchanger 105 which has inlet/outlet interconnections 105a and 105b. Then the refueling gas is released into the tank. After refueling, the gas conduit tubes are de-pressurized, illustrated in FIG. 4C. V2 and V11 are closed. V102 is opened to allow gas flow to the power plant. As a result of fuel consumption by the power plant, the pressure in the tubes (indicated as P in the drawing figures) is reduced; after P reduces to a predetermined value, optimally, the design operating pressure for introduction into the power plant, all valves switch to the driving mode for low pressure operation and in-tank warming shown in FIG. 4D. V2 and V102 allow gas flow to the power plant through pressure regulators PR2 and PR102. Regulated gas flow through PR2 is conducted through end cap inlet GF 2 through tank outlet GF 1 through heat exchanger 105 where heat H3 is absorbed and introduced as a warming flow H4 through in situ heat exchanger 15. The pressure regulator PR2 in the embedded end cap system maintains a predetermined low pressure, for example 1 MPa. As a result of the gas flow, the tank fuel gas receives ambient heat from the external heat exchanger, exhausted heat from the power-plant, a heater, chemical reaction or metal hydrate tank and the circulating gas releases the heat into the tank. As a result, concerns about driving are obviated wherein during driving, the gas inside the fuel tanks becomes cold as a result of the tank pressure decrease; the tank fuel is warmed in the flow circuit. In parking mode, V102 and V2 are closed and P is maintained at the same pressure, or at a lower pressure, as when the vehicle is in driving mode.

Figure 5:
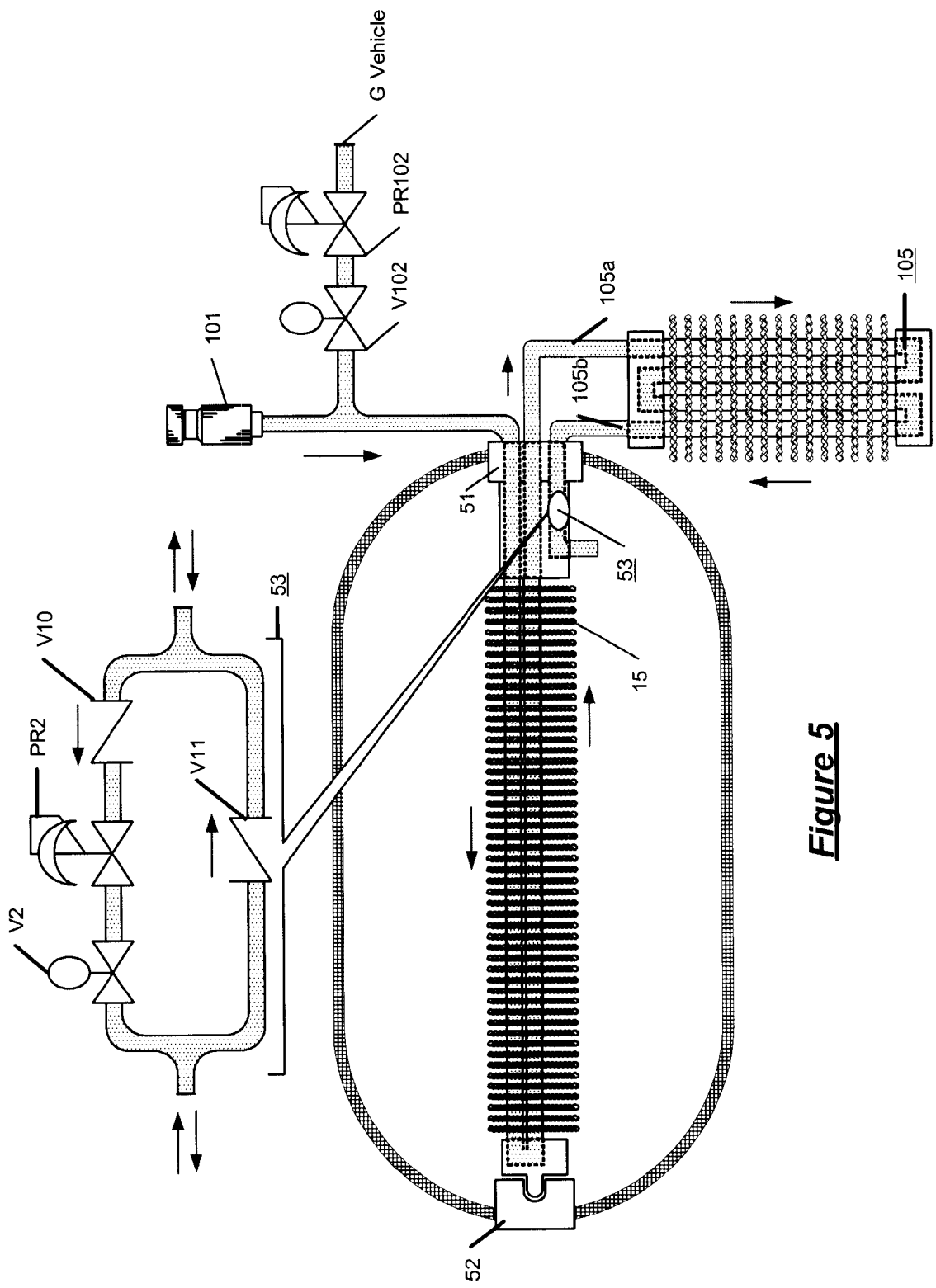
FIG. 5 is a general depiction of a longitudinal cross section showing fluid flow in a single ended tank system of the invention.

Thus in the two ended example, one end of the heat exchanger is fixedly secured within the tank; the opposite end is configured to allow controlled gas flow and a slight degree of axial translation and rotation between the pin and receptacle parts. Comparable function may be embedded in a tank having only one port as shown in FIG. 5 showing pin and receptacle end cap 52 and a fixedly installed control/embedded end cap 51 at opposite ends of the tank. Gas flow in the conduits of the one end embodiment follows the arrows shown, namely, from the receptacle through the in situ device in the tank through the external heat exchanger and into/from the tank through the embedded control valves and regulators 53. Operation of the embedded valves and regulators 53 in the end cap 51 corresponds to the protocols outlined above with respect to valves V2, V10 and V11 and pressure regulator PR2 in the dual ended example of FIG. 4A described above in reference to FIG. 4B, FIG. 4C, FIG. 4D and FIG. 4E for the refueling, de-pressuring, driving and parking modes of vehicle operation.

Thus, a typical system is comprised of a high pressure gas storage tank; the thermal management system; port plugs for the opposite ends of the tank (fixed) and (compensatorial); a return manifold for gas circulation; and an embedded valve and regulator system for at least one tank end.

Having described the invention in detail, those skilled in the art will appreciate that, given the present description, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

The invention claimed is:

1. In situ gas flow management equipment disposed within a high pressure industrial gas storage tank wherein longitudinally extending thermal management equipment is installed in the interior of the tank along the central axis thereof comprising 1) a stem extending from one end of the thermal management equipment; 2) a fixed receptacle at an end of the tank disposed in operative relationship with the stem such that longitudinal displacement and axial rotation between the stem and receptacle is permitted; and 3) a gas flow control embedded within the receptacle regulating the flow of gas into and from the tank.

2. The equipment of claim 1 wherein the gas flow control embedded within the receptacle includes a flow conduit into and from the tank on one side thereof at an exterior end of the tank and the gas flow conduit branches into two segments leading into the tank interior.

3. The equipment of claim 2 wherein one segment of the gas flow control branching from the gas flow conduit includes a check valve allowing gas flow in one direction only.

4. The equipment of claim 2 wherein the check valve allows gas flow only into the tank.

5. The equipment of claim 2 wherein one segment of the gas flow control branching from the gas flow conduit includes a switchable control valve allowing gas flow in one direction only from the tank.

6. The equipment of claim 5 wherein the one segment of the gas flow control branching from the gas flow conduit further includes a pressure regulator.

7. The equipment of claim 2 wherein the two segments of the gas flow conduit that branch into the tank interior direct the flow of gas in a heat exchange loop that thermally interconnects the in situ device installed within the tank interior to a heat exchange device that is exterior to the tank.

8. The flow management equipment of claim 1 wherein the one end of longitudinally extending in situ thermal management equipment opposite the end of the thermal management equipment having the stem is fixedly installed at a boss at the opposite end of the tank and the boss includes gas flow inlet and outlet openings for the gas flow through the in situ device.

9. The flow management equipment of claim 8 wherein one of the inlet and outlet openings in the boss is interconnected in a gas flow circuit to an external heat exchanger.

10. Flow management equipment of claim 1 wherein the one end of longitudinally extending in situ thermal management equipment opposite the end of the thermal management equipment having the stem is fixedly installed at a boss at one end of the tank and the boss includes gas flow inlet and outlet openings for the gas flow through the in situ device and gas flow inlet and outlet openings interconnected with a gas flow control embedded within the boss for regulating the flow of gas into and from the tank.

11. Flow management equipment of claim 10 wherein the gas flow control embedded in the boss includes at least one of a check valve, a control valve and a pressure regulator.

12. Flow management equipment of claim 10 wherein the gas flow inlet and outlet openings interconnected with a gas flow control embedded within the boss are interconnected in a gas flow circuit to an external heat exchange device that is interconnected with the in situ device.

13. Flow management equipment of claim 10 wherein the gas flow control embedded in the boss includes a flow path branched into two segments leading to and from a single conduit at each end thereof and each segment includes therein at least one of a check valve, a control valve and a pressure regulator.

* * * * *